(12) United States Patent
Tighe et al.

(10) Patent No.: US 7,006,494 B1
(45) Date of Patent: Feb. 28, 2006

(54) SYSTEM AND METHOD FOR A VIRTUAL TELEPHONY INTERMEDIARY

(75) Inventors: James R. Tighe, Frisco, TX (US); Ronald D. Higgins, The Colony, TX (US); Richard B. Platt, Allen, TX (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,297

(22) Filed: Jan. 4, 2000

(51) Int. Cl.
*H04L 12/28* (2006.01)

(52) U.S. Cl. ...................... 370/389; 370/352
(58) Field of Classification Search ............... 370/352, 370/356, 389, 401; 379/80
See application file for complete search history.

(56) References Cited

U.S. PATENT DOCUMENTS

| | | | |
|---|---|---|---|
| 4,631,534 A | 12/1986 | Franklin et al. | |
| 5,033,079 A | 7/1991 | Catron et al. | 379/100 |
| 5,058,110 A | 10/1991 | Beach et al. | |
| 5,093,827 A | 3/1992 | Franklin et al. | |
| 5,375,167 A | 12/1994 | Bales et al. | |
| 5,455,855 A | 10/1995 | Hokari | 379/229 |
| 5,471,318 A | 11/1995 | Ahuja et al. | |
| 5,559,883 A * | 9/1996 | Williams | |
| 5,583,863 A | 12/1996 | Darr, Jr. et al. | 370/397 |
| 5,610,910 A | 3/1997 | Focsaneanu et al. | 370/351 |
| 5,623,488 A | 4/1997 | Svennevik et al. | |
| 5,623,601 A | 4/1997 | Vu | 395/187.01 |
| 5,636,371 A * | 6/1997 | Yu | |
| 5,640,446 A | 6/1997 | Everett et al. | |
| 5,642,407 A | 6/1997 | He | 379/87 |
| 5,692,039 A | 11/1997 | Brankley et al. | 379/229 |
| 5,710,591 A | 1/1998 | Bruno et al. | 348/15 |
| 5,748,736 A | 5/1998 | Mittra | |
| 5,778,174 A | 7/1998 | Cain | 395/187.01 |
| 5,781,550 A * | 7/1998 | Templin et al. | |
| 5,802,058 A | 9/1998 | Harris et al. | |
| 5,803,199 A | 9/1998 | Walter | |
| 5,805,803 A | 9/1998 | Birrell et al. | 395/187.01 |
| 5,826,014 A | 10/1998 | Coley et al. | 395/187.01 |
| 5,835,718 A | 11/1998 | Blewett | 395/200.48 |
| 5,857,191 A | 1/1999 | Blackwell, Jr. et al. | 707/10 |
| 5,867,494 A | 2/1999 | Krishnaswamy et al. | |
| 5,867,495 A | 2/1999 | Elliott et al. | |
| 5,872,779 A * | 2/1999 | Vaudreuil | |
| 5,884,025 A * | 3/1999 | Baehr et al. | |

(Continued)

FOREIGN PATENT DOCUMENTS

| | | |
|---|---|---|
| EP | 0 841 831 | 5/1998 |
| WO | WO 98/11704 | 3/1998 |

OTHER PUBLICATIONS

Cisco Systems, Inc.; "System Description for the Cisco Communications Network Version 2.1;" Cisco Communications Network; all, 1997.

*Primary Examiner*—Chau Nguyen
*Assistant Examiner*—Steven Blount
(74) *Attorney, Agent, or Firm*—Baker Botts L.L.P.

(57) ABSTRACT

A virtual telephony intermediary is provided that includes a first logical port associated with a first telephony device and a second logical port associated with a second telephony device. The virtual telephony intermediary also includes a data manipulation module that manipulates telecommunication data in a payload section of a packet received from the first telephony device at the second logical port. The virtual telephony intermediary further includes a transmission module operable to communicate the manipulated telecommunication data to the second telephony device.

27 Claims, 3 Drawing Sheets

U.S. PATENT DOCUMENTS

| | | | |
|---|---|---|---|
| 5,896,379 A * | 4/1999 | Haber | |
| 5,963,547 A | 10/1999 | O'Neil | |
| 5,983,005 A | 11/1999 | Monteiro et al. | |
| 6,002,689 A * | 12/1999 | Christie et al. | 370/401 |
| 6,006,272 A * | 12/1999 | Aravamudan et al. | |
| 6,018,766 A | 1/2000 | Samuel et al. | |
| 6,020,915 A | 2/2000 | Bruno et al. | 348/15 |
| 6,138,144 A | 10/2000 | DeSimone et al. | 709/204 |
| 6,151,679 A * | 11/2000 | Friedman et al. | |
| 6,154,839 A * | 11/2000 | Arrow et al. | |
| 6,163,810 A | 12/2000 | Bhagavath et al. | |
| 6,173,314 B1 | 1/2001 | Kurashima et al. | 709/204 |
| 6,175,618 B1 | 1/2001 | Shah et al. | 379/201 |
| 6,175,867 B1 * | 1/2001 | Taghadoss | |
| 6,181,697 B1 | 1/2001 | Nurenberg et al. | |
| 6,226,373 B1 | 5/2001 | Zhu et al. | |
| 6,259,701 B1 | 7/2001 | Shur et al. | |
| 6,272,633 B1 * | 8/2001 | Duke et al. | 713/171 |
| 6,321,336 B1 * | 11/2001 | Applegate et al. | |
| 6,360,265 B1 * | 3/2002 | Falck et al. | |
| 6,363,411 B1 | 3/2002 | Dugan et al. | 709/202 |
| 6,363,424 B1 | 3/2002 | Douglas et al. | 709/224 |
| 6,374,298 B1 * | 4/2002 | Tanno | |
| 6,385,193 B1 * | 5/2002 | Civanlar et al. | |
| 6,389,130 B1 | 5/2002 | Shenoda et al. | |
| 6,389,462 B1 | 5/2002 | Cohen et al. | 709/218 |
| 6,404,745 B1 | 6/2002 | O'Neil et al. | |
| 6,404,746 B1 | 6/2002 | Cave et al. | |
| 6,404,764 B1 | 6/2002 | Jones et al. | 370/352 |
| 6,418,138 B1 | 7/2002 | Cerf et al. | |
| 6,421,437 B1 | 7/2002 | Slutsman | 379/201.02 |
| 6,430,176 B1 | 8/2002 | Christie | |
| 6,446,127 B1 | 9/2002 | Schuster et al. | |
| 6,449,269 B1 * | 9/2002 | Edholm | |
| 6,477,169 B1 | 11/2002 | Angle et al. | |
| 6,487,196 B1 | 11/2002 | Verthein et al. | 370/352 |
| 6,512,818 B1 | 1/2003 | Donovan et al. | 379/88.18 |
| 6,523,068 B1 * | 2/2003 | Beser et al. | 709/238 |
| 6,529,514 B1 | 3/2003 | Christie et al. | |
| 6,564,261 B1 | 5/2003 | Gudjonsson et al. | 709/227 |
| 6,567,851 B1 | 5/2003 | Kobayashi | 709/228 |
| 6,584,562 B1 | 6/2003 | Fiori | 713/151 |
| 6,594,699 B1 | 7/2003 | Sahai et al. | 709/228 |
| 6,603,849 B1 | 8/2003 | Lin et al. | 379/221.01 |
| 6,608,825 B1 | 8/2003 | Luddy | 370/342 |
| 6,614,784 B1 | 9/2003 | Glitho et al. | 370/352 |
| 6,674,758 B1 * | 1/2004 | Watson | 370/401 |

* cited by examiner

SYSTEM AND METHOD FOR A VIRTUAL TELEPHONY INTERMEDIARY

CROSS-REFERENCE TO RELATED APPLICATIONS

This application is filed concurrently with the following commonly-owned applications:
SYSTEM AND METHOD FOR PROVIDING SECURITY IN A TELECOMMUNICATION NETWORK, Ser. No. 09/477,193;
SYSTEM AND METHOD FOR MAINTAINING A COMMUNICATION LINK, Ser. No. 09/477,192; and
SYSTEM AND METHOD FOR ENABLING MULTICAST TELECOMMUNICATIONS, Ser. No. 09/477,298.

TECHNICAL FIELD OF THE INVENTION

This invention relates generally to the field of telecommunications, and more specifically to a system and method for a virtual telephony intermediary.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. VoIP technology allows many of the advantages of IP networks to be applied to telecommunication data transmitted over IP networks to create features that would otherwise be unavailable with traditional telecommunications.

SUMMARY OF THE INVENTION

In accordance with the present invention, a system and method for a virtual telephony intermediary is provided that substantially eliminates or reduces disadvantages or problems associated with previously developed systems and methods. In particular, the present invention contemplates a virtual telephony intermediary capable of serving as an intermediary between two or more telephony devices to enable communication between the telephony devices. In one embodiment of the present invention, a virtual telephony intermediary is provided that includes a first logical port associated with a first telephony device and a second logical port associated with a second telephony device. The virtual telephony intermediary also includes a data manipulation module that manipulates telecommunication data in a payload section of a packet received from the first telephony device at the second logical port. The virtual telephony intermediary further includes a transmission module operable to communicate the manipulated telecommunication data to the second telephony device.

In another embodiment of the present invention, a method provides a virtual telephony intermediary between telephony devices. The method includes receiving telecommunication data in a payload section of a packet sent from a first telephony device at a virtual telephony intermediary. The method further includes manipulating the telecommunication data received from the first telephony device and communicating the manipulated data to the second telephony device.

Technical advantages of the present invention include a virtual telephony intermediary that may be logically inserted between telephony devices to act as an intermediary between the telephony devices. Once such a connection is established, signaling and media streams that pass through the virtual telephony intermediary may be manipulated for various reasons before they are sent on to the destination device.

Advantages of such manipulation include the ability to provide address translation, provide network security, duplicate streams, dynamically redirect streams, maintaining connections between devices, and inject media. A virtual telephony intermediary may also serve as an intermediary between telephony devices that use different types of call or control signaling, compression or encoding formats, sizes of data payloads, media sampling lengths, or any other communication parameters. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
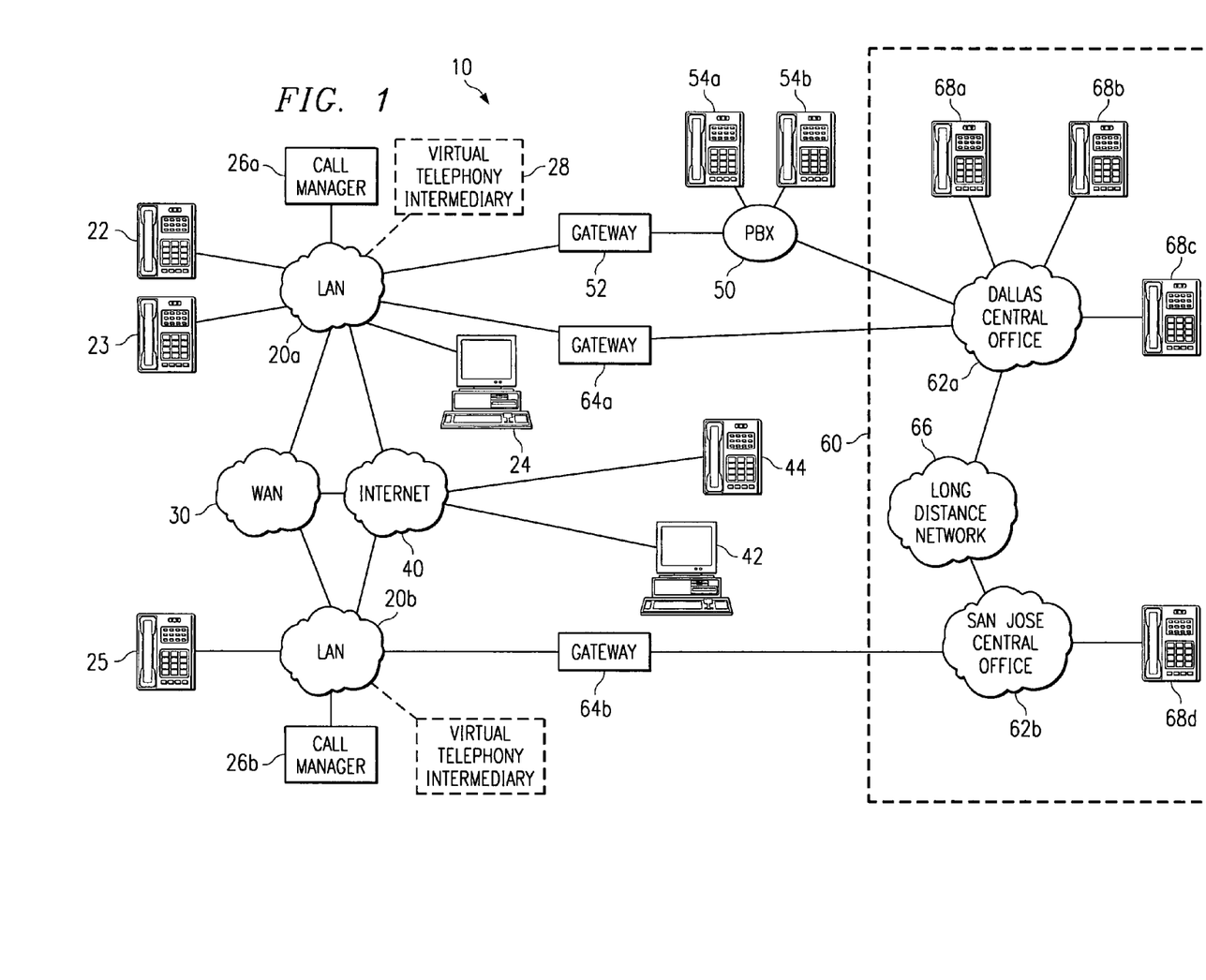
FIG. 1 illustrates an exemplary communication network in accordance with the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In the particular embodiment illustrated in FIG. 1, LANs 20 are Internet Protocol (IP) networks. However, LANs 20 may be any type of network that allows the transmission of audio and video telecommunication data, as well as traditional data communications. Therefore, although subsequent description will primarily focus on IP telephony devices, it should be understood that other appropriate telephony devices, such as Voice over Frame Relay devices, are also included within the scope of this description.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateways. For example, LAN 20a is coupled to a private branch exchange (PBX) 50 through a gateway 52. PBX 50 represents analog and/or digital telephone systems used by businesses. PBX 50 includes a plurality of extension telephones or subscriber sets 54a and 54b to which PBX 50 directs incoming telephone calls. Gateway 52 may be either an analog or a digital gateway depending on the type of PBX 50 to which it is coupled. The operation of the gateways in communication network 10 is described in further detail below.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateways 64, described below.

Central offices 62 are coupled through a long distance network 66 that allows communication between residences and businesses coupled to central offices in different areas, such as CO 62a in Dallas and CO 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees for calls between LAN 20a and LAN 20b by using WAN 30 to transmit calls between the LANs. Internet 40 may also be used to transmit calls.

IP networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). IP telephony devices 22–24 are coupled to LAN 20a to allow such communication over LAN 20a. IP telephony devices 22–24 have the capability of encapsulating a user's voice (or other inputs) into IP packets so that the voice can be transmitted over LAN 20a, WAN 30 and/or Internet 40. IP telephony devices may include telephones, fax machines, computers running telephony software (such as MICROSOFT NETMEETING), gateways, or any other device capable of performing telephony functions using an IP network.

An IP telephony device typically resembles a traditional digital PBX telephony device, but instead of connecting to a proprietary PBX port, the telephony device plugs into a LAN jack, such as an Ethernet jack. Alternatively, a user may plug a handset or headset directly into a personal computer 24 on LAN 20 to form a virtual IP telephony device. An IP telephony device operates as a standard IP network device and typically has its own IP address (which may be assigned dynamically). IP telephony devices may be H.323-compliant, so that they can communicate with other H.323 devices, such as a device executing MICROSOFT NETMEETING. This feature is described in more detail below. IP telephony devices may also have the ability to handle data coding and decoding at the telephony device. This feature allows the telephony device to switch encoding schemes on demand, such as switching between G.711 and G.723 encoding.

A call manager 26a controls IP telephony devices 22–24 (a similar call manager 26b may be located on LAN 20b) Call manager 26a is an application that controls call processing, routing, telephone features and options (such as call hold, call transfer and caller ID), device configuration, and other telephony functions and parameters within communication network 10. Call manager 26a can control all of the IP telephony devices on LAN 20a, and it may also control IP telephony devices located across WAN 30. For example, call manager 26a is capable of controlling telephony devices on LAN 20b. Thus, call manager 26b may be eliminated entirely or used as a redundant controller.

When a user wishes to place a call from one IP telephony device on LAN 20a to another IP telephony device on LAN 20a (an intra-LAN call), the calling telephony device transmits a signal to call manager 26a indicating the desired function and the telephony device to be called. Call manager 26a then checks on the availability of the called telephony device and, if available, sets up the call by instructing the originating telephony device to establish a media (audio and/or video) stream with the called (target) telephony device. The initial signaling between call manager 26a and either the originating telephony device or the target telephony device is transmitted over LAN 20a (and, if necessary, WAN 30) using, for example, the Transmission Control Protocol (TCP).

The TCP layer in the transmitting telephony device divides the data to be transmitted into one or more packets, numbers the packets, and then forwards them individually to the IP network layer for transmission to the destination telephony device. Although each packet has the same destination IP address, the packets may travel along different paths to reach the intended destination. As the packets reach the destination telephony device, the TCP layer reassembles the individual packets and ensures that they all have arrived. Once TCP reassembles the data, it forwards the data to the destination telephony device as a single message.

After call manager 26a initiates the call with signaling over TCP, a codec (coder/decoder) converts the voice, video or fax signals generated by the users of the telephony devices from analog voice signals into digital form. The codec may be implemented either in software or as special-purpose hardware in IP telephony devices 22–24. In the case of an IP telephone, as the user speaks into the handset, the codec converts the analog voice signals into digital data. The digitally encoded data is then encapsulated into IP packets so that it can be transmitted over LAN 20a.

The encapsulation may be performed by Real-Time Transport Protocol (RTP) running over User Datagram Protocol (UDP), or any other suitable communication protocol.

As with TCP, UDP uses the Internet Protocol to get data packets from one computer to another. Unlike TCP, however, UDP does not provide sequencing and error-checking of the arriving packets. However, since UDP does not perform these functions, UDP operates faster than TCP and is useful when speed is more important than accuracy. This is true of media streaming since it is critical that the data be transmitted as quickly as possible, but it is not critical that every single packet is reassembled correctly (either its absence is negligible or its content can be extrapolated by the destination telephony device). Once UDP has received and reassembled the IP packets at the destination telephony device, a codec in the destination telephony device translates the digital data into analog audio and/or video signals for presentation to the user. The entire process is repeated each time that any call participant (or any other source) generates an audio, video, or fax signal.

In addition to intra-LAN calls, calls can also be placed to and received from non-IP telephony devices 54, 68 that are connected to PBX 50 or PSTN 60. Such calls are made through a gateway 52, 64. Because gateway 52 performs similarly to gateway 64, only gateway 64 will be discussed in further detail. Gateway 64 converts analog or digital circuit-switched data transmitted by PSTN 60 to packetized data transmitted by LAN 20, and vice-versa. When voice data packets are transmitted from LAN 20, gateway 64 retrieves the data contained in the incoming packets and converts this digital data to the analog or digital format used by the PSTN trunk to which gateway 64 is coupled. Since the digital format for voice transmissions over an IP network is often different than the format used on the digital trunks of PSTN [60], the gateway provides conversion between these different digital formats, referred to as transcoding. Gateway 64 also translates between the VoIP call control system and the Signaling System 7 (SS7) protocol or other signaling protocols used in PSTN 60.

For voice transmissions from PSTN 60 to LAN 20, the process is reversed. Gateway 64 takes the incoming voice transmission (in either analog or digital form) and converts it into the digital format used by LAN 20. The digital data is then encapsulated into IP packets and transmitted over LAN 20.

When making a call to a PSTN telephony device 68 from IP telephony device 22 on LAN 20a, the voice or fax signal generated by the user of IP telephony device 22 is digitized and encapsulated, as described above. The packets are then transmitted over LAN 20a to gateway 64. If more than one PSTN gateway 64 is coupled to LAN 20a, call manager 26a determines which gateway is to receive the transmission based on the telephone number (e.g., the North American Numbering Plan (NANP) number) of the PSTN telephony device. Gateway 64 retrieves the IP packets and converts the data to the format (either digital or analog) used by the PSTN trunk to which the gateway is connected. The voice signals are then sent to PSTN telephony device 68 over PSTN 60. This process, and the reverse process, is continued between PSTN 60 and LAN 20a through gateway 64 until the call is complete.

Calls can also be made between an IP telephony device located on LAN 20 and another IP telephony device located on another LAN 20, across WAN 30, or on Internet 40. For example, a call may be placed between IP telephony device 22 connected to LAN 20a and IP telephony device 25 connected to LAN 20b. As discussed above, the analog voice or fax data is digitized and encapsulated into IP packets at the originating IP telephony device 22. However, unlike communications with telephony devices on PSTN 60, gateway 64 is not needed to convert the IP packets to another format. Instead, a router (or other similar device) directs the packets to the IP address of the target IP telephony device 25. IP telephony device 25 then retrieves the data and converts it to analog form for presentation to the user. Either call manager 26a or call manger 26b (on LAN 20b) may control IP telephony device 25.

When a call is placed to an IP telephony device, for example IP telephony device 22, a call initiation request is first sent to call manager 26a. If the originating telephony device is an IP telephony device (e.g., an intra-LAN or inter-LAN IP call), the originating IP telephony device generates the call initiation request and sends the request to call manager 26a. If the originating telephony device is a non-IP telephony device, such as PSTN telephony device 68, gateway 64a first intercepts the incoming call from CO 62a, and sends a call initiation request to call manager 26a indicating the IP telephony device that is being called. In either case, once call manager 26a receives the call initiation request, call manager 26a sends a signal to IP telephony device 22 offering the call to the telephony device.

If IP telephony device 22 can accept the call (e.g., it is not in use or under a Do Not Disturb instruction from the user), IP telephony device 22 replies to call manager 26a that it will accept the call. Upon receiving this acceptance, call manager 26a transmits a signal to IP telephony device 22 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals. Once IP telephony device 22 has been taken off-hook, call manager 26a establishes an RTP audio and/or video stream between IP telephony device 22 and the originating telephony device. If the originating telephony device is a non-IP telephony device, such as PSTN telephony device 68, the data streaming occurs between IP telephony device 22 and gateway 64. Gateway 64 then transmits the audio and/or video data to PSTN telephony device 68.

One advantage associated with IP telephony devices is their ability to communicate and interact with any other IP device coupled to the IP network. For example, IP telephony devices may interact and communicate with other IP telephony devices, with nonIP telephony devices, and even with virtual telephony devices. A virtual telephony device may be implemented as software, firmware and/or hardware to interact with devices in communication network 10. Virtual telephony devices may be implemented on any existing or dedicated device on the IP network. For example, call manager 26a may contain software for implementing one or more virtual telephony devices. Virtual telephony device software or firmware may also be located on any other network device and embodied in any type of computer-readable medium. The computer or other device on which the virtual telephony device software is located includes a network interface, a memory or other computer-readable medium to store the software, and a processor to execute the software.

A virtual telephony intermediary 28, one type of virtual telephony device, may be logically inserted between two or more telephony devices to act as an intermediary between the telephony devices. Once such a relationship is established, signaling and media streams that pass through the virtual telephony intermediary may be modified through address translation or data stream manipulation for various reasons before they are sent to the destination device. Reasons for such modifications include providing network security, duplicating streams, dynamically redirecting streams, maintaining connections between devices, converting between data formats (e.g., A-Law to p-Law), and injecting media.

In order for a call or other communication to be placed through a virtual telephony intermediary, for example, a call placed to IP telephony device 22 in LAN 20 through virtual telephony intermediary 28, telephony device 22 registers with virtual telephony intermediary 28. Call manager 26a instructs telephony device 22 to register with virtual telephony intermediary 28 (or a user may manually instruct telephony device 22 to do so), and telephony device 22 signals virtual telephony intermediary 28 via TCP/IP indicating that it would like to register. If virtual telephony intermediary 28 accepts the registration request, telephony device 22 sends a registration message to virtual telephony intermediary 28 using TCP/IP (or any other appropriate media transmission protocol). The registration message typically comprises information about the telephony device such as the telephony device's IP and media access control (MAC) addresses, the type of telephony device, and the codec(s) used by the telephony device.

Figure 2:
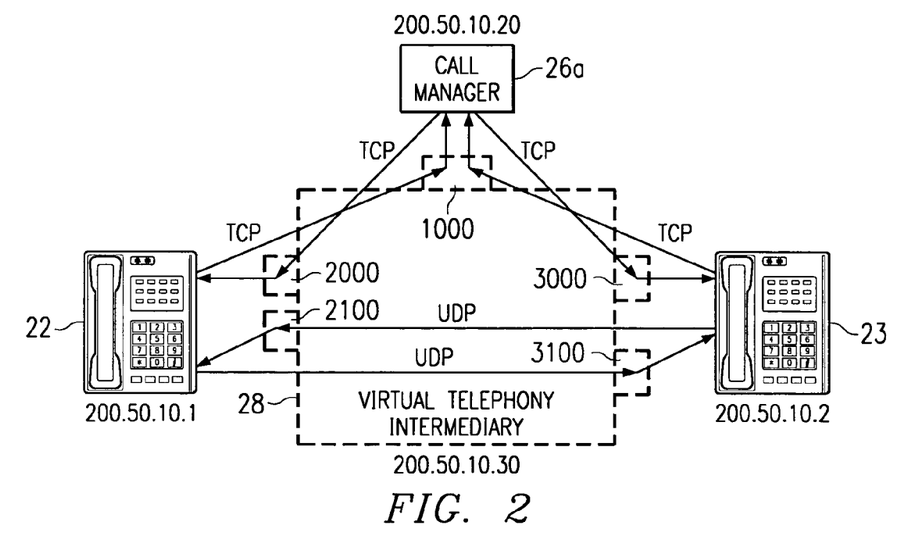
FIG. 2 illustrates an exemplary communication link between telephony devices using a virtual telephony intermediary.

FIG. 2 illustrates an exemplary communication link created using virtual telephony intermediary 28. It should be noted that although the TCP and UDP protocols are specifically identified in the following discussion, any other suitable signaling and media transmission protocols may be used. Virtual telephony intermediary 28 initiates this communication link by first creating a logical connection to telephony device 22. Creating this logical connection involves associating logical UDP and/or TCP ports of the virtual telephony intermediary 28 with telephony device 22. Virtual telephony intermediary 28 designates a TCP port (for example, port 2000) as the signaling port of telephony device 22, and designates a UDP port (for example, port 2100) as the streaming port of telephony device 22. Virtual telephony intermediary 28 may instruct call manager 26a to send all signaling directed to telephony device 22 to logical port 2000 of virtual telephony intermediary 28. Likewise, virtual telephony intermediary 28 may instruct call manager 26a to send all media streaming directed to telephony device 22 from other telephony devices to logical port 2100 of virtual telephony intermediary 28. Virtual telephony intermediary 28 will automatically forward any data that is subsequently sent to these ports to telephony device 22.

In order to create a communication link between telephony devices 22 and 23, a logical connection is also made to telephony device 23. For example, telephony device 23 may be assigned a logical TCP port of 3000 and a logical UDP port of 3100 of virtual telephony intermediary 28. Likewise, virtual telephony intermediary 28 may also designate a TCP port (for example, port 1000) as the signaling port of call manager 26a (data is typically not streamed using RTP to and from call manager 26, so a UDP port is usually not required). Virtual telephony intermediary 28 may then instruct telephony devices 22 and 23 (as well as any other registered telephony devices) to send all signaling directed to call manager 26a to logical port 1000 of virtual telephony intermediary 28. In this manner, UDP streaming between telephony devices 22 and 23, as well as TCP signaling between the telephony devices and call manager 26, can be transmitted via virtual telephony intermediary 28.

Figure 3:
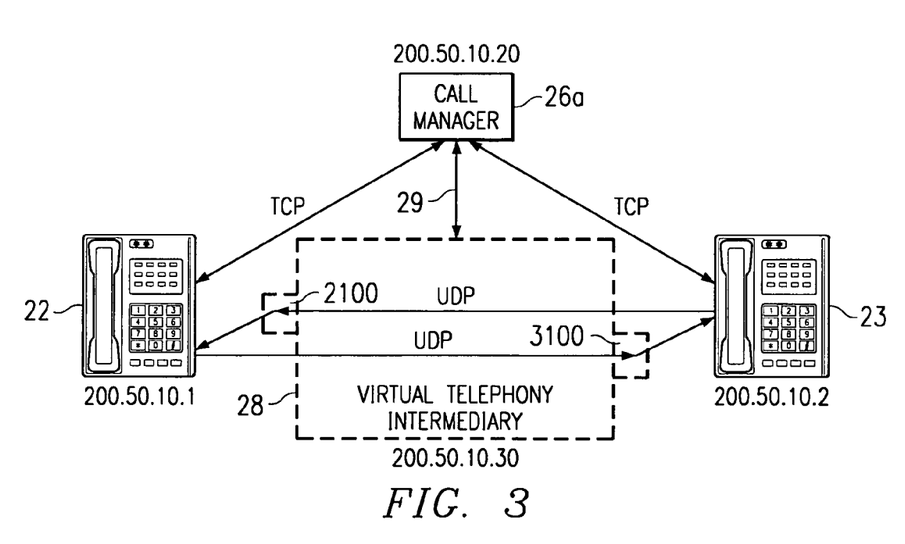
FIG. 3 illustrates another exemplary communication link between telephony devices using a virtual telephony intermediary.

FIG. 3 illustrates an alternative communication link between telephony devices 22 and 23. Although FIG. 2 shows the TCP signaling between IP telephony devices and call manager 26a being directed through virtual telephony intermediary 28, this signaling may also be directly transmitted between call manager 26a and telephony devices 22 and 23. Virtual telephony intermediary 28 is used only as an intermediary through which RTP streams between telephony devices 22 and 23 are sent using logical UDP ports 2100 and 3100. In this case, a control link 29 between call manager 26a and virtual telephony intermediary 28 is used. Control link 29 is used to instruct the virtual telephony intermediary 28 as to when UDP connections should be created or destroyed and how the logical ports should be associated with telephony devices 22 and 23.

The communication links illustrated in FIGS. 2 and 3 are used to enable a call between telephony devices 22 and 23 as follows. Telephony device 23 initially sends a call initiation request via TCP to call manager 26a indicating a desire to communicate with telephony device 22. Call manager 26a then sends signaling information via TCP to telephony device 22 indicating the incoming call from telephony device 23. This TCP signaling between telephony device 23 and call manager 26a may be passed through virtual telephony intermediary 28, as illustrated in FIG. 2, or it may be directly transmitted between telephony device 23 and call manager 26a, as shown in FIG. 3. If telephony device 22 accepts the call, call manager 26a establishes RTP media streaming between telephony devices 22 and 23 by signaling telephony device 23 to begin streaming media to port 2100 of virtual telephony intermediary 28.

When media packets are received at port 2100, virtual telephony intermediary 28 examines the packets and notes the source address of the data. This source address is the IP address of telephony device 23, for example, 200.50.10.2, and a particular logical port of the IP address. Since telephony device 23 has registered with virtual telephony intermediary 28, virtual telephony intermediary 28 then modifies the source address and port in the header of the IP packets coming from telephony device 23 to the IP address and logical UDP port of virtual telephony intermediary 28 that have been associated with telephony device 23 (200.50.10.30, port 3100). Virtual telephony intermediary 28 then forwards the packets to telephony device 22. Since the header of each packet indicates the data stream originated from port 3100 of virtual telephony intermediary 28, it appears to telephony device 22 that telephony device 23 is actually located at this address and port.

A similar process is performed when telephony device 22 returns an RTP media stream in response to the media stream from telephony device 23. Since telephony device 22 believes that telephony device 23 is located at port 3100 of virtual telephony intermediary 28, telephony device 22 directs its data streaming to this location. When virtual telephony intermediary 28 receives the IP packets at port 3100, virtual telephony intermediary 28 modifies the source IP address and port in the packets' header from the actual port and IP address (200.50.10.1) of telephony device 22 to port 2100 of virtual telephony intermediary 28. Virtual telephony intermediary 28 then forwards the packets to telephony device 23 since the packets were received at port 3100. Since the header of each packet indicates that the data stream originated from port 2100 of virtual telephony intermediary 28, it appears to telephony device 23 that telephony device 22 is actually located at this address and port. All subsequent RTP streams sent between telephony devices 22 and 23 are similarly passed through and modified by virtual telephony intermediary 28.

Since all data that is sent between two or more IP telephony devices may be passed through virtual telephony intermediary 28, virtual telephony intermediary 28 can be used for other functions in addition to the address translation function described above. One such use is as an intermediary between telephony devices that use different types of call or control signaling, data encoding formats, sizes of data payloads, audio/video sampling lengths, or any other communication parameters. Virtual telephony intermediary 28 may also be used to provide network security, duplicate streams, dynamically redirect streams, maintain connections between devices, and inject media.

When an intermediary is needed between telephony devices for any of the reasons described, call manager 26*a* (or any other device having virtual telephony intermediary software, firmware and/or hardware) generates virtual telephony intermediary 28, and virtual telephony intermediary 28 establishes a communication link between the telephony devices, as described above in conjunction with FIGS. 2 and 3.

Figure 4:
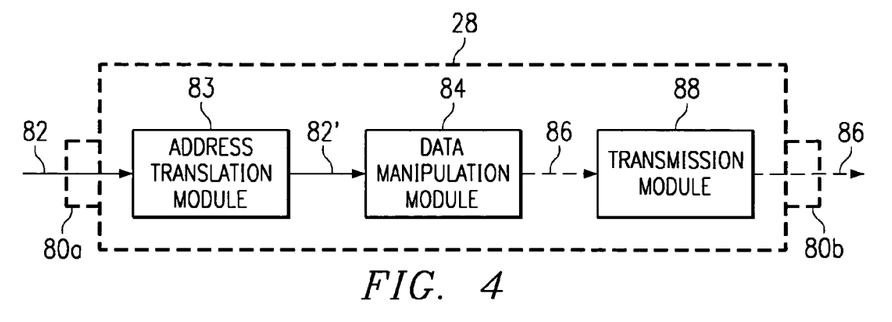
FIG. 4 illustrates an exemplary virtual telephony intermediary.

FIG. 4 illustrates an exemplary virtual telephony intermediary 28. Virtual telephony intermediary 28 includes one or more logical ports 80, such as UDP or TCP ports. Incoming telecommunication data 82, such as RTP media streaming, is received from a telephony device at logical port 80*a* and is communicated to an address translation module 83. Address translation module 83 modifies source address information associated with telecommunication data 82, such as an IP header associated with telecommunication data 82 contained in a payload section of an IP packet. As described above, this address translation may include changing a source IP address in the IP packet header to the address of virtual telephony intermediary 28, and changing the source port in a header to the logical port 80 of virtual telephony intermediary 28 associated with the telephony device from which telecommunication data 82 was received (e.g., port 80*b*). Address modification module 83 transfers telecommunication data 82' with the modified source address information to a data manipulation module 84. Alternatively, if address translation is not performed, telecommunication data may be transferred directly to data manipulation module 84 upon receipt by virtual telephony intermediary 28.

Data manipulation module 84 may manipulate telecommunication data 82, such as the data contained in the payload section of incoming IP packets, in a variety of ways. This manipulation may include buffering, duplicating and/or recording incoming telecommunication data 82. Furthermore, data manipulation module 84 may convert telecommunication data 82 from a first data format to a second data format. For example, data manipulation module 84 may convert from one audio encoding format, such as G.711, to another audio encoding format, such as G.729. Data manipulation module 84 may also convert between different data compression formats (such as A-law and $\mu$-law) or between different signaling protocols.

Data manipulation module 84 may also add media or other data to telecommunication data 82 or delete a portion or all of telecommunication data 82. For example, data manipulation module 84 may delete the data in the payload section of incoming packets. The "empty" packets are then communicated to a telephony device (e.g., to simulate placing the telephony device "on hold"). In addition, data manipulation module 84 may add music or other substitute telecommunication data to the "empty" payload section before communicating the packets to the on-hold telephony device.

After one or more of the above manipulations, data manipulation module 84 transfers manipulated telecommunication data 86 to a transmission module 88, such as a TCP/IP or UDP/IP protocol stack. Transmission module 88 communicates manipulated telecommunication data 86 to the appropriate telephony device or devices. If address translation module 83 has performed an address translation, manipulated telecommunication data 86 appears to the destination telephony device to have been sent from the logical port 80 (such as port 80*b*) that is associated with the telephony device that originally sent telecommunication data 82. Furthermore, although telecommunication data 82 may be received from a single telephony device, transmission module 88 may send manipulated telecommunication data 86 to multiple telephony devices (e.g., when data manipulation module 84 duplicates telecommunication data 82).

Figure 5:
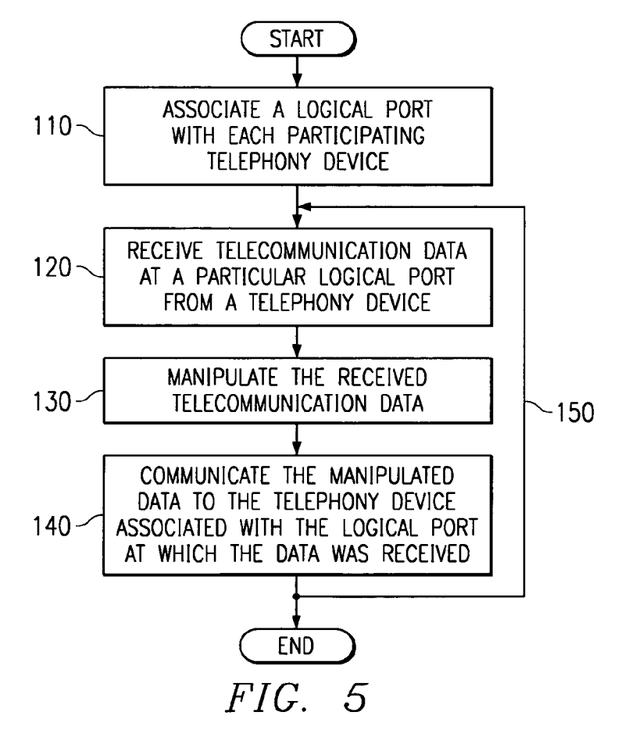
FIG. 5 illustrates a method for providing a virtual telephony intermediary between telephony devices.

FIG. 5 illustrates an exemplary method for providing a virtual telephony intermediary 28 between telephony devices. Each telephony device that participates in a communication using virtual telephony intermediary 28 is associated with a particular logical port 80 of virtual telephony intermediary 28 at step 110. Virtual telephony intermediary 28, call manager 26*a* or 26*b*, or any other appropriate network device may make these associations. It should be understood, however, that if address translation module 83 is bypassed, then these associations may not be made. However, address translation is preferred since it ensures that all communications between the participating telephony devices are passed through virtual telephony intermediary 28, as described above in conjunction with FIGS. 2 and 3.

Virtual telephony intermediary 28 receives telecommunication data from a participating telephony device at step 120. If address translation is to be performed, the data is received at a particular logical port 80 associated with the telephony device to which virtual telephony intermediary 28 is to communicate the telecommunication data after manipulation. Data manipulation module 84 of virtual telephony intermediary 28 manipulates the received telecommunication data at step 130, as described above in conjunction with FIG. 4. Transmission module 88 communicates the manipulated data at step 140 to the telephony device associated with the logical port 80 at which the telecommunication data was received. Alternatively, transmission module 88 may communicate the manipulated data to one or more telephony devices specified by data manipulation module 84. For example, if the incoming telecommunication data is duplicated, data manipulation module 84 may indicate which telephony device the duplicated data is to be communicated (e.g., a telephony device that is monitoring a communication). The method described above is repeated, as indicated by arrow 150, each time that a participating telephony device transmits telecommunication data to virtual telephony intermediary 28.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for providing a virtual telephony intermediary between a first telephony device and a second telephony device, comprising:
   associating a first logical port of the virtual telephony intermediary with the first telephony device;
   associating a second logical port of the virtual telephony intermediary with the second telephony device;
   receiving telecommunication data in a payload section of a packet sent from a first telephony device at the second logical port of the virtual telephony intermediary;
   manipulating the telecommunication data received from the first telephony device;
   modifying source address information associated with telecommunication data received at the second logical port from the first telephony device to specify the first logical port of the virtual telephony intermediary; and
   communicating the manipulated telecommunication data with the modified source address information to the second telephony device.

2. The method of claim 1, wherein modifying source address information in the telecommunication data comprises modifying a source IP address and port information in a header of an Internet Protocol (IP) packet.

3. The method of claim 1, wherein associating the first and second logical ports of the virtual telephony intermediary with the first and second telephony devices comprises associating a User Datagram Protocol (UDP) logical port with each telephony device to enable the streaming of IP packets to each telephony device.

4. The method of claim 1, wherein manipulating the telecommunication data received from the first telephony device comprises duplicating the telecommunication data.

5. The method of claim 1, wherein manipulating the telecommunication data received from the first telephony device comprises converting the telecommunication data from a first data format compatible with the first telephony device to a second data format compatible with the second telephony device.

6. The method of claim 1, wherein manipulating the telecommunication data received from the first telephony device comprises replacing the telecommunication data with substitute telecommunication data.

7. A virtual telephony intermediary, comprising:
   a first logical port associated with a first telephony device;
   a second logical port associated with a second telephony device;
   a data manipulation module operable to manipulate telecommunication data in a payload section of a packet received from the first telephony device at the second logical port;
   a transmission module operable to communicate the manipulated telecommunication data to the second telephony device; and
   an address translation module operable to modify source address information associated with the telecommunication data received from the first telephony device to specify the first logical port of the virtual telephony intermediary.

8. The virtual telephony intermediary of claim 7, wherein the first and second logical ports are User Datagram Protocol (UDP) logical ports.

9. The virtual telephony intermediary of claim 7, wherein the address translation module is further operable to modify a source IP address and port information in a header of an IP packet.

10. The virtual telephony intermediary of claim 7, wherein the data manipulation module is operable to duplicate the telecommunication data received from the first telephony device.

11. The virtual telephony intermediary of claim 7, wherein the data manipulation module is operable to convert the telecommunication data received from the first telephony device from a first data format compatible with the first telephony device to a second data format compatible with the second telephony device.

12. The virtual telephony intermediary of claim 11, wherein the first and second data formats are audio encoding formats.

13. The virtual telephony intermediary of claim 7, wherein the data manipulation module is operable to replace the telecommunication data with substitute telecommunication data.

14. A communication network, comprising:
   a first telephony device;
   a second telephony device; and
   a virtual telephony intermediary logically inserted between the first and second telephony devices, the virtual telephony intermediary including:
      a first logical port associated with the first telephony device;
      a second logical port associated with the second telephony device;
      a data manipulation module operable to manipulate telecommunication data in a payload section of a packet received from the first telephony device at the second logical port;
      a transmission module operable to communicate the manipulated telecommunication data to the second telephony device; and
      an address modification module operable to modify source address information in the telecommunication data received from the first telephony device to specify the first logical port of the virtual telephony intermediary.

15. The communication network of claim 14, further comprising a call manager operable to:
   generate the virtual telephony intermediary; and
   establish a communication link between the first telephony device and the second telephony device using the virtual telephony intermediary.

16. The communication network of claim 14, wherein the data manipulation module of the virtual telephony intermediary is operable to duplicate the telecommunication data received from the first telephony device.

17. The communication network of claim 14, wherein the data manipulation module of the virtual telephony intermediary is operable to convert the telecommunication data received from the first telephony device from a first data format compatible with the first telephony device to a second data format compatible with the second telephony device.

18. The communication network of claim 17, wherein the first and second data formats are audio encoding formats.

19. The communication network of claim 14, wherein the data manipulation module of the virtual telephony intermediary is operable to replace the telecommunication data with substitute telecommunication data.

20. Virtual telephony intermediary software embodied in a computer-readable medium and operable to perform the following steps:
   associating a first logical port of a virtual telephony intermediary with a first telephony device;

associating a second logical port of the virtual telephony intermediary with a second telephony device;

receiving telecommunication data in a payload section of a packet sent from the first telephony device at the second logical port of the virtual telephony intermediary;

manipulating the telecommunication data received from the first telephony device;

modifying source address information associated with telecommunication data received at the second logical port from the first telephony device to specify the first logical port of the virtual telephony intermediary; and communicating the manipulated telecommunication data with the modified source address information to the second telephony device.

21. The virtual telephony intermediary software of claim 20, wherein modifying source address information in the telecommunication data comprises modifying a source IP address and port information in a header of an Internet Protocol (IP) packet.

22. The virtual telephony intermediary software of claim 20, wherein associating the first and second logical ports of the virtual telephony intermediary with the first and second telephony devices comprises associating a User Datagram Protocol (UDP) logical port with each telephony device to enable the streaming of IP packets to each telephony device.

23. The virtual telephony intermediary software of claim 20, wherein manipulating the telecommunication data received from the first telephony device comprises duplicating the telecommunication data.

24. The virtual telephony intermediary software of claim 20, wherein manipulating the telecommunication data received from the first telephony device comprises converting the telecommunication data from a first data format compatible with the first telephony device to a second data format compatible with the second telephony device.

25. The virtual telephony intermediary software of claim 24, wherein the first and second data formats are audio encoding formats.

26. The virtual telephony intermediary software of claim 20, wherein manipulating the telecommunication data received from the first telephony device comprises replacing the telecommunication data with substitute telecommunication data.

27. A method for providing a virtual telephony intermediary between a first telephony device and a second telephony device, comprising:

associating a first logical port of the virtual telephony intermediary with the first telephony device;

associating a second logical port of the virtual telephony intermediary with the second telephony device;

receiving telecommunication data in a payload section of a packet sent from a first telephony device at the second logical port of the virtual telephony intermediary;

manipulating the telecommunication data received from the first telephony device, wherein manipulating the telecommunication data comprises at least one of:

(i) converting the telecommunication data received from the first telephony device from a first audio encoding format compatible with the first telephony device to a second audio encoding format compatible with the second telephony device,   (ii) converting the telecommunication data received from the first telephony device from a first data compression format compatible with the first telephony device to a second data compression format compatible with the second telephony device, or   (iii) converting the telecommunication data received from the first telephony device from a first signaling protocol compatible with the first telephony device to a second signaling protocol compatible with the second telephony device;

modifying source address information associated with telecommunication data received at the second logical port from the first telephony device to specify the first logical port of the virtual telephony intermediary; and communicating the manipulated telecommunication data with the modified source address information to the second telephony device.

* * * * *